(12) United States Patent
Soon-Shiong

(10) Patent No.: US 12,310,392 B2
(45) Date of Patent: *May 27, 2025

(54) BEVERAGE COMPOSITIONS INCLUDING CALCIUM SUPPLIED FROM ARAGONITE AND METHODS OF MAKING THE SAME

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/779,288

(22) Filed: Jul. 22, 2024

(65) Prior Publication Data

US 2024/0381918 A1 Nov. 21, 2024

Related U.S. Application Data

(63) Continuation of application No. 18/224,686, filed on Jul. 21, 2023, now Pat. No. 12,089,621, which is a
(Continued)

(51) Int. Cl.
*A23L 33/16* (2016.01)
*A23C 9/152* (2006.01)
(Continued)

(52) U.S. Cl.
CPC ............ *A23L 33/16* (2016.08); *A23C 9/1522* (2013.01); *A23C 9/1524* (2013.01); *A23C 9/156* (2013.01);
(Continued)

(58) Field of Classification Search
CPC ........................................... A23L 33/16
See application file for complete search history.

(56) References Cited

U.S. PATENT DOCUMENTS 4,683,921 A    8/1987   Neeser
5,912,032 A *   6/1999   Komatsu ............... A23C 9/15
                                                                   426/74

(Continued)

FOREIGN PATENT DOCUMENTS

WO     2001/084963 A1    11/2001
WO     WO-0184963 A1 *   11/2001  ............ A23G 4/064

OTHER PUBLICATIONS

Office Action from U.S. Appl. No. 17/466,641 dated Nov. 9, 2021.
(Continued)

*Primary Examiner* — Stephanie A Cox
(74) *Attorney, Agent, or Firm* — Harness Dickey & Pierce P.L.C.

(57) ABSTRACT

Beverage compositions and methods of preparing the same are provided herein. The beverage compositions can include calcium supplied from a calcium carbonate source including aragonite and a liquid component, such as water, a juice, a milk, and a combination thereof. Calcium components including aragonite particles and at least one additive agent as well as sweetener components including aragonite particles and at least one sweetener are also provided herein.

18 Claims, 2 Drawing Sheets

Related U.S. Application Data continuation of application No. 17/991,148, filed on Nov. 21, 2022, now Pat. No. 11,793,224, which is a continuation of application No. 17/466,641, filed on Sep. 3, 2021, now Pat. No. 11,533,940.

(60) Provisional application No. 63/076,495, filed on Sep. 10, 2020.

(51) Int. Cl.

| | |
|---|---|
| A23C 9/156 | (2006.01) |
| A23C 11/10 | (2025.01) |
| A23L 2/02 | (2006.01) |
| A23L 2/54 | (2006.01) |
| A23L 2/60 | (2006.01) |
| A23L 27/30 | (2016.01) |

(52) U.S. Cl.
CPC ............ *A23C 11/10* (2013.01); *A23C 11/103* (2013.01); *A23L 2/02* (2013.01); *A23L 2/54* (2013.01); *A23L 2/60* (2013.01); *A23L 27/30* (2016.08); *A23V 2002/00* (2013.01)

(56) References Cited

U.S. PATENT DOCUMENTS

| | | | | |
|---|---|---|---|---|
| 6,093,425 | A * | 7/2000 | Kamarei | A23L 33/15 426/74 |
| 6,106,874 | A * | 8/2000 | Liebrecht | A23L 2/02 426/74 |
| 11,533,940 | B2 | 12/2022 | Soon-Shiong | |
| 11,793,224 | B2 | 10/2023 | Soon-Shiong | |
| 2008/0206403 | A1 * | 8/2008 | Beverini | A23L 2/02 426/51 |
| 2008/0299255 | A1 * | 12/2008 | Kim | A23L 33/135 426/51 |
| 2009/0104312 | A1 * | 4/2009 | Kamarei | A23L 2/52 426/599 |
| 2013/0171294 | A1 * | 7/2013 | Martyn | A23L 2/60 426/71 |
| 2017/0183469 | A1 | 6/2017 | Falken et al. | |
| 2019/0192590 | A1 * | 6/2019 | Biffi | A61K 35/741 |
| 2023/0085907 | A1 | 3/2023 | Soon-Shiong | |
| 2023/0354865 | A1 | 11/2023 | Soon-Shiong | |

OTHER PUBLICATIONS

Office Action from U.S. Appl. No. 17/466,641 dated Feb. 24, 2022.
Office Action from U.S. Appl. No. 17/466,641 dated May 11, 2022.
Calcean "What is Oolitic Aragonite?", Sep. 16, 2019, https://www.calcean.com/blog/2019/9/16/what-is-oolitic-aragonite.
Pisa Carolina "Everything You Need to Know About Oolitic Aragonite", https://pisacarolina.com/everything-you-need-to-know-about-oolitic-aragonite/.
Office Action from U.S. Appl. No. 17/991,148 dated Apr. 12, 2023.
Office Action from U.S. Appl. No. 18/224,686 dated Feb. 28, 2024.
Office Action from U.S. Appl. No. 18/224,686 dated Apr. 24, 2024.

* cited by examiner

BEVERAGE COMPOSITIONS INCLUDING CALCIUM SUPPLIED FROM ARAGONITE AND METHODS OF MAKING THE SAME

CROSS-REFERENCE TO RELATED APPLICATIONS

This patent application is a continuation of U.S. patent application Ser. No. 18/224,686, filed on 21 Jul. 2023, which is a continuation of U.S. patent application Ser. No. 17/991,148, filed on 21 Nov. 2022, now U.S. Pat. No. 11,793,224, issued on 24 Oct. 2023, which is a continuation of U.S. patent application Ser. No. 17/466,641, filed on 3 Sep. 2021, now U.S. Pat. No. 11,533,940, issued on 27 Dec. 2022, which claims the benefit of U.S. Provisional Patent Application No. 63/076,495, filed on 10 Sep. 2020. The entire disclosure of each of the above recited applications are incorporated herein by reference.

FIELD

Beverage compositions, beverage components, and sweetener components as well as methods of making the same are provided herein. The beverage compositions may include calcium supplied from a calcium carbonate ($CaCO_3$) source, for example, aragonite, and a liquid component, for example, water, a milk, or a juice.

BACKGROUND

The background description includes information that may be useful in understanding the systems and methods described herein. It is not an admission that any of the information provided herein is prior art, or that any publication specifically or implicitly referenced is prior art.

Calcium is the most abundant mineral in the human body and is an essential element for numerous functions in the human body. For example, calcium is required for vascular contraction and vasodilation, muscle function, nerve transmission, intracellular signaling and hormonal secretion, as well as providing rigidity to the skeletal framework. Calcium is continuously utilized by the body and can be replenished by a variety of food sources as well as dietary supplements.

In light of these vital usages of calcium by the body, it is recognized that a dietary calcium deficiency can have adverse effects on an individual's health, which vary in degree depending upon age and sex. For example, calcium deficiency can prevent normal bone development in childhood and early adulthood and can contribute to the softening of bones and teeth as well as the acceleration of bone loss with advancing age and can interfere with muscular contractions.

While dairy products are recognized as a rich source of dietary calcium, consumption of dairy products can have drawbacks, for example, individuals can have a lactose intolerance and/or a dairy allergy, and there can be high levels of cholesterol and calories in some dairy products. Furthermore, attempts to fortify beverage compositions with various calcium sources can also be problematic. For example, some of the organic and inorganic salts used for calcium fortification can result in flavor and taste defects, such as chalkiness, grittiness, or tangy tastes and/or even a bitter after-taste based on the use of one or a combination of calcium sources. Thus, alternative beverage compositions fortified with calcium are needed.

SUMMARY

This section provides a general summary of the disclosure, and is not a comprehensive disclosure of its full scope or all of its features.

The present disclosure relates to beverage compositions, beverage components, and methods of making beverage compositions. In various aspects, the present disclosure provides a beverage composition. The beverage composition includes calcium supplied from a calcium carbonate source including aragonite and a liquid component, such as water, a juice, a milk, or a combination thereof.

In various aspects, the present disclosure also provides a calcium component. The calcium component includes aragonite particles encapsulated with at least one additive.

In various aspects, the present disclosure also provides a method for preparing a beverage composition. The method includes admixing aragonite particles with a liquid component, such as water, a juice, a milk, and a combination thereof.

In various aspects, the present disclosure also provides another method for preparing a beverage composition. The method includes admixing a calcium component as described herein with a liquid component, such as water, a juice, a milk, and a combination thereof.

In various aspects, the present disclosure also provides a sweetener component. The sweetener component includes aragonite particles and at least one sweetener.

Various objects, features, aspects and advantages of the present subject matter will become more apparent from the following detailed description of preferred embodiments.

DETAILED DESCRIPTION

Figure 1:
FIG. 1 is an image of a beverage composition according to certain aspects of the present disclosure.

All percentages and ratios are calculated by weight unless otherwise indicated. All percentages and ratios are calculated based on the total composition unless otherwise indicated.

All component or composition levels are in reference to the active level of that component or composition, and are exclusive of impurities, for example, residual solvents or byproducts, which may be present in commercially available sources.

I. Beverage Compositions and Components

Calcium fortified beverage compositions are provided herein. The beverage compositions include calcium supplied from a calcium carbonate ($CaCO_3$) source and a liquid component. The beverage compositions described herein are suitable for human and/or animal consumption.

A. Aragonite

In any embodiment, the calcium carbonate source can comprise aragonite. Aragonite, a natural orthorhombic crystalline form of calcium carbonate, occurs most commonly in beds of gypsum and of iron ore. Aragonite differs from calcite in that is has an orthorhombic crystalline structure, a greater specific gravity (2.93 to 2.95 g/cm$^3$ as compared to 2.71 g/cm$^3$ for calcite), and less distinct cleavage than calcite.

One form of aragonite, known as "oolitic aragonite," occurs on the ocean floor throughout the world. Oolitic aragonite occurs in discrete grains which are essentially spherical in form. The material as a marine deposit is unconsolidated and varies in grain size with varying amounts of shell fragments intermixed therein. Oolitic aragonite can be found in the Caribbean, for example, on and around the Bahama islands. An exemplary composition of oolitic aragonite is provided in Table 1 below.

TABLE 1

| Composition | Percent by Weight |
|---|---|
| CaCO$_3$ | 97.00 |
| SiO$_2$ | 0.04 |
| Fe$_2$O$_3$ | 0.02 |
| Al$_2$O$_3$ | 0.02 |
| MgO | 0.23 |
| Mn | 0.0005 to 0.005 |
| Sr | 0.1 to 1.0 |
| S (organic) | 0.13 |
| S (inorganic) | 0.01 |
| Chloride (as NaCl) | 0.25 |
| Other organic matter | 0.41 |

Oolitic aragonite may be recovered from the ocean floor, for example, by dredging or otherwise removing the oolitic aragonite from the ocean floor. Dredging of the ocean floor can take place near, adjacent to, or at a beach in the Bahama Islands. The recovered oolitic aragonite can include various sizes of material. In any embodiment, the recovered oolitic aragonite can have a particular size diameter from about 50 µm to about 2 mm. In some embodiments, oolitic aragonite can first be screened to remove any oversized material, such as shell fragments having a particle size diameter greater than or equal to about 275 µm. Alternatively, oolitic aragonite can be used directly from the ocean without any screening, grinding, or both. In other words, the oolitic aragonite can be unprocessed when incorporated into a beverage composition. Thus, the term "unprocessed" as used herein, means no further treatment to the aragonite after its recovery from the ocean floor other than the mere handling and transport of it to a stock pile and then admixing with a liquid component. In any embodiment, the oolitic aragonite is substantially dry, for example, containing about 10% or less moisture, prior to incorporation into a beverage composition and/or further processing to form a calcium component as further described below.

In some embodiments, at least a portion of or substantially all of the oolitic aragonite may be ground prior to incorporation into a beverage composition, for example, in a ball mill. Suitable milling techniques and milled oolitic particles are described in U.S. 62/839,322, filed on 26 Apr. 2019, the entire contents of which are herein incorporated by reference. The oolitic aragonite may be ground to oolitic particles having a diameter of greater than or equal to about 1 µm, greater than or equal to about 3 µm, greater than or equal to about 5 µm, greater than or equal to about 8 µm, greater than or equal to about 10 µm, greater than or equal to about 13 µm, greater than or equal to about 15 µm, greater than or equal to about 18 µm, or about 20 µm; or from about 1 µm to about 20 µm, about 1 µm to about 15 µm, about 3 µm to about 10 µm, about 3 µm to about 8 µm, or about 3 µm to about 5 µm.

B. Other Sources of Calcium

Additionally or alternatively, calcium in the beverage composition may be further supplied from one or more other sources of calcium. Exemplary other sources of calcium include amino acid chelated calcium, elemental calcium, calcium oxide, calcium hydroxide, calcium sulfate, calcium chloride, calcium phosphate, calcium hydrogen phosphate, calcium dihydrogen phosphate, calcium citrate, calcium picolinate, calcium malate, calcium aspartate calcium citrate malate, calcium gluconate, calcium tartrate, calcium ascorbate, calcium lactate, and combinations thereof. The calcium sources described herein include any compound containing calcium, including a salt, complex, or solubilized species.

In any embodiment, calcium may be present in the beverage composition in an amount by weight based on the total beverage composition of greater than or equal to about 0.05%, greater than or equal to about 0.1%, greater than or equal to about 0.5%, greater than or equal to about 1%, greater than or equal to about 2%, greater than or equal to about 5%, greater than or equal to about 7%, greater than or equal to about 10%, greater than or equal to about 15%, greater than or equal to about 20%, greater than or equal to about 30%, or about 40%. Additionally or alternatively, calcium may be present in the beverage composition in an amount by weight based on the total beverage composition of about 0.05% to about 40%, about 0.1% to about 30%, about 0.1% to about 20%, about 0.1% to about 10%, about 0.1% to about 5%, or about 0.1% to about 2%.

C. Liquid Component

In various aspects, a liquid component of the beverage compositions may be selected from the group consisting of water, a juice, a milk, and a combination thereof. In one preferred embodiment, the liquid component may be water. For example, FIG. 1 shows an image of a beverage composition including water and calcium supplied from aragonite. It is also contemplated herein that the liquid component, such as water, may also include coffee or tea.

Any variety of juices and/or juice concentrates may be incorporated into the beverage composition. For example, the juice may selected from a citrus juice, a non-citrus juice, a vegetable juice, or a combination thereof. Examples of a citrus juice include, but are not limited to orange juice, lemon juice, lime juice, grapefruit juice, tangerine juice and combinations thereof. Examples of a non-citrus juice include, but are not limited to apple juice, strawberry juice, kiwi juice, grape juice, cherry juice, raspberry juice, cranberry juice, peach juice, watermelon juice, passion fruit juice, pineapple juice, mango juice, cupuacu juice, guava juice, cocoa juice, papaya juice, apricot juice, and combinations thereof. Examples of vegetable juice include, but are not limited to tomato juice, spinach juice, broccoli juice, cucumber juice, celery juice, wheatgrass juice, kale juice, carrot juice, beet juice, cabbage juice, parsley juice, Swiss chard juice, bell pepper juice, lettuce juice, and combinations thereof.

Any variety of milks may be incorporated into the beverage composition, for example, a dairy milk, a non-dairy milk, or a combination thereof. Examples of dairy milk include, but are not limited to, cow's milk, sheep's milk, goat's milk, and camel's milk. Examples of non-dairy milks include, but are not limited to, soy milk, oat milk, almond milk, cashew milk, rice milk, coconut milk, pea milk, macadamia milk, hemp milk, quinoa milk, flax milk, and combinations thereof.

In any embodiment, the liquid component may be present in the beverage composition in an amount by weight based on the total beverage composition of greater than or equal to about 0.05%, greater than or equal to about 0.1%, greater than or equal to about 1%, greater than or equal to about 5%, greater than or equal to about 10%, greater than or equal to about 20%, greater than or equal to about 40%, greater than or equal to about 60%, greater than or equal to about 70%, greater than or equal to about 80%, greater than or equal to about 90%, or about 99.9%. Additionally or alternatively, the liquid component may be present in the beverage composition in an amount by weight based on the total beverage composition of about 0.05% to about 99.9%, about 0.1% to about 99.9%, about 0.1% to about 80%, about 5% to about 60%, about 5% to about 40%, or about 5% to about 20%.

D. Additive Agents

Additionally, a beverage composition described herein optionally may further include at least one additive agent. Any suitable additive agent for beverage compositions may be included. Examples of an additive agent include, but are not limited to an acidulant, a flavor agent, an antifoaming agent, a colorant, a preservative, a sweetener, a nutrient agent, a fiber, a probiotic, a thickener, an antioxidant, an emulsifying agent, a bracer, and a combination thereof.

E. Acidulants

An amount of an acidulant may be used to maintain the pH of the beverage composition. For example, a beverage composition may have a pH of from about 2 to about 8, about 2 to about 7, about 2.5 to about 7, or about 3.5 to about 4.5. Acidity of the beverage composition can be adjusted to and maintained within the requisite range by known and conventional methods, e.g., the use of one or more of the aforementioned acidulants.

Organic as well as inorganic edible acids may be used as acidulants to adjust the pH of the beverage. An acid can be present in its undissociated form or, alternatively, as their respective salts, for example, potassium or sodium hydrogen phosphate, potassium or sodium dihydrogen phosphate salts. Examples of suitable acids include, but are not limited to edible organic acids, such as citric acid, malic acid, fumaric acid, adipic acid, phosphoric acid, gluconic acid, tartaric acid, ascorbic acid, acetic acid, phosphoric acid or combinations thereof.

F. Antioxidants

The acidulant can also serve as an antioxidant to stabilize beverage components in the beverage compositions. Examples of commonly used antioxidants include, but are not limited to ascorbic acid, EDTA (ethylenediaminetetraacetic acid), and salts thereof.

G. Flavor Agents

Flavor agents can include flavor emulsions and/or flavor concentrates. Flavor emulsions can include one or more suitable flavor oils, extracts, oleoresins, essential oils and the like, known in the art for use as flavor agents in beverages. The flavor emulsion can also include flavor concentrates, such as those derived from concentration of natural products such as fruits. Terpeneless citrus oils and essences can also be used. Examples of suitable flavors include, for example, fruit flavors, such as apple, strawberry, lemon, grapefruit, kiwi, lime, grape, tangerine, orange, cherry, raspberry, cranberry, peach, strawberry, blueberry, mango, grapefruit, passion fruit, pineapple, cupuacu, guava, cocoa, papaya, apricot, raspberry, blackberry, watermelon, and the like, cola flavors, coffee flavors, chocolate flavors, vanilla flavors, caramel flavors, chai flavors, and dairy flavors. Other botanical flavors include, but are not limited to tea (preferably black and green tea, most preferably green tea), aloe vera, guarana, ginseng, ginkgo, hawthorn, hibiscus, rose hips, chamomile, peppermint, fennel, ginger, licorice, lotus seed, schizandra, saw palmetto, sarsaparilla, safflower, St. John's Wort, curcuma, cardamom, nutmeg, cassia bark, buchu, cinnamon, jasmine, haw, chrysanthemum, water chestnut, sugar cane, lychee, bamboo shoots, and the like. These flavors can be derived from natural sources such as essential oils and extracts, or can be synthetically prepared. The flavor emulsion can typically comprises a blend of various flavors and can be employed in the form of an emulsion, alcoholic extract, or spray dried. The flavor emulsion can also include clouding agents, with or without weighting agents.

Flavor emulsions can be prepared by mixing one or more flavoring oils (from about 0.001% to about 20%) with an emulsifying agent (from about 1% to about 30%) and water. Emulsions of particles with diameters of from about 0.1 to about 3.0 microns or about 2.0 microns or less in diameter or about 1.0 microns or less in diameter are suitable. The emulsifying agent coats the particularized flavor oil to aid in preventing coalescence and in maintaining an appropriate dispersion. The viscosity and specific gravity of the flavor emulsion are regulated to be compatible with the finished beverage.

H. Antifoaming Agents

Examples of suitable antifoaming agents include, but are not limited to, dimethyl polysiloxane, distilled monoglycerides, medium chain triglycerides, polyglycerol esters, and combinations thereof.

I. Colorants

Examples of suitable colorants include, but are not limited to FD&C (Food, Drugs, and Cosmetics) dyes, for example, yellow #5, blue #2, red #40, and the like, and FD&C lakes, for example, Lake red #40, Lake yellow #6, Lake blue #1, and the like. Additionally, a mixture of a FD&C dye or a FD&C lake in combination with other conventional food and food colorants may be used. Riboflavin and β-carotene may also be used. Additionally, other natural colorants may be utilized including, for example, fruit, vegetable, and/or plant extracts such as grape, black currant, aronia, carrot, beetroot, red cabbage, and hibiscus. The colorant may be present in the beverage composition described herein an amount by weight based on total weight of the composition from about 0.0001% to about 0.5%, about 0.001% to about 0.1%, and about 0.004% to about 0.1.

J. Flavanols

The flavanols which may be used in the beverage compositions described herein can be extracted from, for example, fruit, vegetables, green tea or other natural sources by any suitable method well known to those skilled in the art. Flavanols may be extracted from either a single plant or mixtures of plants. Examples of flavanols which are extracted from tea plants and other members of the Catechu gambir (Uncaria family) include, for example, catechin, epicatechin, gallocatechin, epigallocatechin, epicatechin gallate, and epigallocatechin gallate. In some embodiments, the flavanols can be in the form of a tea extract. The tea extract can be obtained from the extraction of unfermented teas, fermented teas, partially fermented teas, and mixtures thereof. Alternatively, flavanols may be prepared by synthetic or other appropriate chemical methods and incorporated into the beverage compositions. Flavanols, including catechin, epicatechin, and their derivatives are commercially available. One or more flavanols may be present in the beverage composition described herein an amount by weight based on total weight of the composition from about 0.001% to about 5%, about 0.001% to about 2%, about 0.01% to about 1%, and about 0.01% to about 0.05%.

K. Preservatives

Examples of suitable preservatives include, but are not limited to sorbate, benzoate, and polyphosphate preservatives (e.g., sodium hexametapolyphosphate). Sorbate and benzoate preservatives include, but are not limited to sorbic acid, benzoic acid, and salts thereof, including, but not limited to, calcium sorbate, sodium sorbate, potassium sorbate, calcium benzoate, sodium benzoate, potassium benzoate, and combinations thereof. One or more preservative may be present in the beverage composition described herein an amount by weight based on total weight of the composition from about 0.0005% to about 0.5%, about 0.001% to about 0.4%, about 0.001% to about 0.1%, about 0.001% to about 0.05%, and about 0.003% to about 0.03%.

L. Sweeteners

Examples of suitable sweeteners include, but are not limited to carbohydrate sweeteners (e.g., monosaccharides and/or disaccharides), natural sweeteners, artificial calorie sweeteners, and combinations thereof. Examples of sugar sweeteners include, but are not limited to, sucrose, fructose, glucose, and combinations thereof. The sweetener may be cane sugar, brown sugar, granulated sugar, powdered sugar, caster sugar, or combinations thereof. Fructose can be obtained or provided as liquid fructose, high fructose corn syrup, dry fructose or fructose syrup. High fructose corn syrup (HFCS) is commercially available as HFCS-42, HFCS-55 and HFCS-90. Other naturally occurring sweeteners or their purified extracts include, for example, glycyrrhizin, stevioside, thaumatin, the juice of Luo Han Guo (containing the sweet mogrosides), agave syrup, monk fruit sweetener, and combinations thereof. Non-limiting examples of artificial sweeteners include aspartame, saccharine, cyclamates, acesulfame K, L-aspartyl-L-phenylalanine lower alkyl ester sweeteners, L-aspartyl-D-alanine amides, L-aspartyl-D-serine amides, L-aspartyl-hydroxymethyl alkane amide sweeteners, L-aspartyl-1-hydroxyethylalkane amide sweeteners, and synthetic alkoxy aromatics. These sweeteners can be incorporated into the beverage compositions in solid or liquid form, for example, as a syrup, such as a concentrated syrup. One or more sweeteners may be present in the beverage composition described herein in an amount by weight based on total weight of the composition from about 0.1% to about 20% or from about 6 to about 14%. In some embodiments, one or more artificial sweeteners may be present in the beverage composition described herein in an amount by weight based on total weight of the composition from about 0.0001% to about 5%, about 0.001% to about 3%, about 0.005% to about 2%, about 0.01% to about 1%, and about 0.01% to about 0.05%.

M. Nutrient Agents

Nutrient agents include, for example, vitamins and minerals. Unless otherwise specified herein, wherein a given vitamin is present in the beverage composition, the beverage composition comprises at least about 1%, at least about 2%, from about 2% to about 200%, preferably from about 5% to about 150%, and from about 10% to about 120% of the USRDI of such vitamin. The United States Recommended Daily Intake (USRDI) for vitamins and minerals is defined and set forth in the Recommended Daily Dietary Allowance-Food and Nutrition Board, National Academy of Sciences-National Research Council.

Non-limiting examples of vitamins include vitamin A, one or more B-complex vitamins (which include one or more of thiamin (also referred to as "vitamin $B_1$")), riboflavin (also referred to as "vitamin $B_2$"), niacin (also referred to as "vitamin $B_3$"), pantothenic acid (also referred to as "vitamin $B_5$"), pyridoxine (also referred to as "vitamin $B_6$"), biotin (also referred to as "vitamin $B_7$" or "vitamin $B_8$"), folic acid (also referred to as folate), and the cobalamins (also referred to as "vitamin $B_{12}$"), vitamin C, vitamin D, and vitamin E. The vitamins may be in any form, for example, an oil, beadlet, or encapsulated.

As used herein, "vitamin A" is inclusive of one or more nutritionally active unsaturated hydrocarbons, including the retinoids and the carotenoids. Common retinoids include retinol, retinal, retinoic acid, retinyl palmitate, and retinyl acetate. Common carotenoids include β-carotene, α-carotene, β-apo-8'-carotenal, cryptoxanthin, canthaxanthin, astacene, and lycopene.

As used herein, "vitamin C" is inclusive of one or more of L-ascorbic acid (also referred to herein as ascorbic acid), as well as their bioequivalent forms including salts and esters thereof. For example, the sodium salt of ascorbic acid is considered vitamin C herein. Additionally, there are many widely known esters of vitamin C, including ascorbyl acetate.

As used herein, "vitamin E" is inclusive of one or more tocols or tocotrienols which exhibit vitamin activity similar to that of α-tocopherol (which, as used herein, is considered a tocol) as well as their bioequivalent forms including salts and esters thereof. Vitamin E is typically found in oils including, for example, sunflower, peanut, soybean, cottonseed, corn, olive, and palm oils. Non-limiting examples of vitamin E include α-tocopherol, β-tocopherol, gamma-tocopherol, and delta-tocopherol, as well as esters thereof (e.g., α-tocopherol acetate).

Non-limiting examples of suitable minerals include magnesium, zinc, iron, selenium, iodine, and fluoride. Minerals may be in, for example, salts, chelated, complexed, solubilized, or colloidal form. In some embodiments, the mineral may be in encapsulated form.

Non-limiting examples of suitable magnesium sources include elemental magnesium, magnesium chloride, magnesium citrate, magnesium gluceptate, magnesium gluconate, magnesium hydroxide, magnesium lactate, magnesium carbonate, magnesium oxide, magnesium picolate, magnesium sulfate, amino acid chelated magnesium, creatine chelated magnesium, solubilized species thereof, and mixtures thereof.

As used herein, "zinc" is inclusive of any compound containing zinc, including a salt, complex, or other form of zinc, including elemental zinc. The zinc which can be in any of the commonly used forms such as, e.g., zinc lactate, zinc sulfate, zinc chloride, zinc acetate, zinc gluconate, zinc ascorbate, zinc citrate, zinc aspartate, zinc picolinate, amino acid chelated zinc, and zinc oxide. Amino acid chelated zinc contain one or more natural amino acids selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids.

As used herein, "iron" is inclusive of any compound containing iron, including a salt, complex, or other form of iron, including elemental iron. Non-limiting examples of ferrous iron sources include ferrous sulfate, ferrous fumarate, ferrous succinate, ferrous gluconate, ferrous lactate, ferrous tartrate, ferrous citrate, ferrous amino acid chelates, and ferrous pyrophosphate, as well as mixtures of these ferrous salts. Non-limiting examples of ferric iron sources that can be used are ferric saccharate, ferric ammonium citrate, ferric citrate, ferric sulfate, ferric chloride, and ferric pyrophosphate, as well as mixtures of these ferric salts. Additionally, other suitable sources of iron include iron-sugar-carboxylate complexes.

In one embodiment, the nutrient agent is selected from the group consisting of vitamin A, vitamin C, vitamin E, vitamin $B_1$, vitamin $B_2$, vitamin $B_3$, vitamin $B_5$, vitamin $B_6$, vitamin $B_7$, vitamin $B_9$, vitamin $B_{12}$, zinc, potassium, iron, magnesium, biotin, folic acid, and a combination thereof.

N. Fibers

A suitable fiber may be a soluble fiber. Soluble fibers can be obtained from a wide variety of plant sources. For example, water soluble plant pectin and pectin materials, galactomannan, arabinogalactan, and water soluble hemicellulose can function as soluble fibers. Many plant mucus, gums found in grains, seeds or stems, such as chamois, guar, oats (beta glucan), astragalus (tragant gum), gati gum, karaya gum (sterculia gum), acacia gum, are soluble fibers. Other soluble fibers include soluble polysaccharides, algal polysaccharides, such as agar or carrageenan, carbohydrates, such as maltodextrin or dextrin, soluble cellulose ethers and derivatives thereof, inulin, and combinations thereof.

O. Thickeners

One or more thickeners may be present in the beverage composition, for example, to provide control of viscosity and/or texture. Non-limiting examples of thickeners include cellulose compounds, gum ghatti, modified gum ghatti, xanthan gum, tragacanth gum, guar gum, gellan gum, locust bean gum, pectin, alginate, and combinations thereof. Non-limiting examples of cellulose compounds include carboxymethylcellulose, sodium carboxymethylcellulose, methylcellulose, and hydroxyethylcellulose, hydroxypropylcellulose. One or more thickeners may be present in the beverage composition described herein in an amount by weight based on total weight of the composition from about 0.00001% to about 10%, about 0.00001% to about 5%, 0.00001% to about 1%, about 0.01% to about 0.2%, to about 0.02% to about 0.05%.

P. Emulsifiers

Non-limiting examples of suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, alginate, and combinations thereof. One or more emulsifiers may be present in the beverage composition described herein in an amount by weight based on total weight of the composition from about 0.00001% to about 10%, about 0.00001% to about 5%, 0.00001% to about 1%, about 0.01% to about 0.2%, to about 0.02% to about 0.05%.

Q. Probiotics

Non-limiting examples of suitable probiotics include bacterial strains of *Bifidobacteria, Lactobacillus*, and a combination thereof. Examples of *Bifidobacteria* include, but are not limited to *B. brevis, B. animalis (laetis), B. longum, B. bifidum, B. adolescentis, B. thermophilum, B. infantile*, and combinations thereof. Examples of *Lactobacillus* include, but are not limited *L. acidophilus, L. casei, L. rhamnosus, L., paracasei, L. johnsonii, L. reuteri, L. lactis, L. buigaricus*, and combinations thereof.

R. Bracers

Bracers can be obtained by extraction from a natural source or can be synthetically produced. Non-limiting examples of bracers include methylxanthines, e.g., caffeine, theobromine, and theophylline. Additionally, numerous other xanthine derivatives have been isolated or synthesized, which may be utilized as a bracer in the compositions herein. For example, bracers include xanthine, 9-methyl xanthine, 7-methyl xanthine, 3-methyl xanthine, 3,7-dimethyl xanthine, 8-chloromethyl-3,7-dimethyl xanthine, 8-hydroxymethyl-3,7-dimethyl xanthine, 3,7-diethyl xanthine, 3,7-bis-(2-hydroxyethyl) xanthine, 3-propyl-7-(dimethylaminoethyl) xanthine, 1-methyl xanthine, 1,9-dimethyl xanthine, 1-methyl-8-methylthio xanthine, 8-phenyl-1-methyl xanthine, 1,7-dimethyl xanthine, 1,7-dimethyl-8-oxo xanthine, 1,3-dimethyl xanthine, 1,3,9-trimethyl xanthine, 8-fluoro theophylline, 8-chloro theophylline, 8-bromo theophylline, 8-thio theophylline, 8-methylthio theophylline, 8-ethylthio theophylline, 8-nitro theophylline, 8-methylamino theophylline, 8-dimethylamino theophylline, 8-methyl theophylline, 8-ethyl theophylline, 8-propyl theophylline, 8-cyclopropyl theophylline, theophylline-8-propionate (ethyl ester), 8-benzyl theophylline, 8-cyclopentyl theophylline, 8-cyclohexyl theophylline, 8-(3-indolyl) theophylline, 8-phenyl theophylline, 9-methyl-8-phenyl theophylline, 8-(p-chlorophenyl) theophylline, 8-(p-bromophenyl) theophylline, 8-(p-methoxyphenyl) theophylline, 8-(p-nitrophenyl) theophylline, 8-(p-dimethylaminophenyl) theophylline, 8-(p-methylphenyl) theophylline, 8-(3,4-dichlorophenyl) theophylline, 8-(m-nitrophenyl) theophylline, 8-(o)-nitrophenyl) theophylline, 8-(o-carboxyphenyl) theophylline, 8-(1-naphthyl) theophylline, 8-(2,6-dimethyl-4-hydroxyphenyl) theophylline, 7-methoxy-8-phenyl theophylline, 1,3,7-trimethyl xanthine, S-chloro caffeine, S-oxo caffeine, S-methoxy caffeine, S-methylamino caffeine, 8-diethylamino caffeine, 8-ethyl caffeine, 7-ethyl theophylline, 7-(2-chloroethyl) theophylline, 7-(2-hydroxyethyl) theophylline, 7-(carboxymethyl) theophylline, 7-(carboxymethyl) theophylline (ethyl ester), 7-(2-hydroxypropyl) theophylline, 7-(2,3-dihydroxypropyl) theophylline, 7-β-D-ribofuranosyl theophylline, 7-(glycero-pent-2-enopyranosyl) theophylline, 7-phenyl theophylline, 7,8-diphenyl theophylline, 1-methyl-3,7-diethyl xanthine, 1-methyl-3-isobutyl xanthine, 1-ethyl-3,7-dimethyl xanthine, 1,3-diethyl xanthine, 1,3,7-triethyl xanthine, 1-ethyl-3-propyl-7-butyl-8-methyl xanthine, 1,3-dipropyl xanthine, 1,3-diallyl xanthine, 1-butyl-3,7-dimethyl xanthine, 1-hexyl-3,7-dimethyl xanthine, and 1-(5-oxohexyl)-3,7-dimethyl xanthine. In some embodiments, methylxanthine is caffeine. Caffeine may be obtained from botanical sources or, alternatively, may be synthetically prepared. Preferred botanical sources of caffeine which may be utilized as a complete or partial source of caffeine include green tea, guarana, mate, black tea, cola nuts, cocoa, and coffee.

A bracer may be present in the beverage composition described herein in an amount by weight based on total weight of the composition from about 0.0005% to about 1%, about 0.003% to about 0.5%, about 0.003% to about 0.2%, about 0.005% to about 0.05%, or about 0.005% to about 0.02%.

S. Carbonation

In some embodiments, the beverage composition optionally can further include carbon dioxide ($CO_2$) such that the beverage composition is carbonated. Carbon dioxide can be introduced into the liquid component (e.g., water) which is mixed with a beverage concentrate or into a beverage composition after dilution to achieve carbonation. The carbonated beverage can be placed into a container, such as a bottle or can, and then sealed. Any conventional carbonation methodology may be utilized to make carbonated beverage compositions. The amount of carbon dioxide introduced into the beverage will depend upon the particular flavor system utilized and the amount of carbonation desired.

T. Calcium Beverage Component

A calcium beverage component is also provided herein. The calcium beverage component comprises aragonite particles as described herein and at least one additive agent as described herein. For example, the aragonite particles may be oolitic aragonite particles having a particle diameter of about 3 µm to about 10 µm, about 3 µm to about 5 µm, or about 3 µm. The at least one additive agent may be present on or with the aragonite particles. In one example, the aragonite particles may be partially, completely or substantially encapsulated with one or more additive agents described herein, such as a flavor agent, a colorant, a thickener, an emulsifier, a nutrient agent, and combinations thereof. Additionally or alternatively, the at least one additive agent may present with the aragonite particles, for example, the at least one additive may be in dry or powdered form and present with the aragonite particles, for example, in a package as a mixture of aragonite and the at least one additive. The dry mixtures may then be mixed by an end user with an appropriate liquid, such as water, milk, or juice, for consumption.

U. Sweetener Component

A sweetener component is also provided herein. It is contemplated herein that the sweetener component may be admixed with any suitable liquid or powder mixture in need of sweetening. For example, the sweetener component may be utilized as a creamer and/or sweetener component and admixed with coffee and/or tea. Alternatively, the sweetener component may be incorporated into any suitable food component, such as, but not limited to, a baking mix, a cooking mix, cereals, grains, rice, etc.

Figure 2:
FIG. 2 is an image of two packages of a sweetener component according to certain aspects of the present disclosure. A sweetener component including 75% aragonite and 25% powdered sugar is in the left hand package, and a sweetener component including 75% aragonite and 25% monk fruit sweetener is in the right hand package.

The sweetener component comprises aragonite particles as described herein and at least one sweetener as described herein. For example, the aragonite particles may be oolitic aragonite particles having a particle diameter of about 3 µm to about 10 µm, about 3 µm to about 5 µm, or about 3 µm. In any embodiment, the at least one sweetener may be cane sugar, brown sugar, granulated sugar, powdered sugar, caster sugar, monk fruit sweetener, agave syrup, or combinations thereof. Additionally or alternatively, the sweetener component may include further additives as describe herein, such as a flavor agent, a colorant, a thickener, an emulsifier, a nutrient agent, and combinations thereof. The at least one sweetener may be present on or with the aragonite particles. In one example, the aragonite particles may be partially, completely or substantially encapsulated with one or more sweetener. Additionally or alternatively, the at least one sweetener may present with the aragonite particles, for example, the at least one sweetener may be in dry or powdered form and present with the aragonite particles, for example, in a package as a mixture of aragonite and the at least one sweetener. FIG. 2 shows an image of a dry mixture of aragonite particles and powdered sugar sweetener and a dry mixture of aragonite particles and monk fruit sweetener. The dry mixtures may then be mixed by an end user, for example, with water, milk, coffee, and/or tea for consumption.

In any embodiment, the aragonite particles and the at least one sweetener may each independently be present in the sweetener component in an amount, based on total weight of the sweetener component, of greater than or equal to about 10%, greater than or equal to about 15%, greater than or equal to about 25%, greater than or equal to about 50%, greater than or equal to about 75%, greater than or equal to about 80%, or about 90%. Additionally or alternatively, the aragonite particles and the at least one sweetener, may each independently be present in the sweetener component in an amount, based on total weight of the sweetener component, of about 10% to about 90%, about 15% to about 80%, about 25% to about 75%, or about 25% to about 50%. For example, the aragonite particles may be present in an amount, based on total weight of the sweetener component, of about 50% to about 75%, and the sweetener may be present in an amount, based on total weight of the sweetener component, of about 25% to about 50%; or both the aragonite particles and the sweetener may each be present in an amount, based on total weight of the sweetener component, of about 50%.

II. Methods for Preparing Beverage Compositions

Methods of preparing beverage compositions are also provided herein. In any embodiment, a method may include admixing aragonite particles as described herein with a liquid component as described herein and optionally, one or more additive agents as described herein. For example, the one or more additive agents, when present, may be dispersed, solubilized, or otherwise mixed into the beverage compositions. In some embodiments, aragonite particles may be admixed with the liquid component followed by addition of one or more additive agents. Alternatively, the liquid component may be admixed with one or more additive agents followed by admixing with aragonite particles. In some embodiments, a method may include admixing a calcium component as described herein with a liquid component as described herein (e.g., water). The methods described herein may include agitating with a mechanical stirrer and/or heating the compositions until all of the components have been solubilized or adequately dispersed or mixed. Where appropriate, all separate solutions and dispersions may then be combined.

Various microbial inactivation/reduction methods may be utilized, including for example: thermal processing, ultraviolet ray (UV) treatment, ultra-high pressure, pulsed electric fields, and filter sterilization. Thermal processing is a commercially accepted method for pasteurized and aseptic (ultra-high-temperature processing) processing. Pasteurization involves heating (indirect or direct) the beverage composition (from about 71° C. to about 95° C.), holding for about 10 seconds to about 20 seconds, and cooling. Aseptic processing of beverages includes heating (from about 95° C. to about 130° C.), holding for about 2 seconds to about 15 seconds, and cooling. Product heating/cooling can be delivered using heat exchangers. Another option is "hot fill" in which the hot product helps to achieve sterility. The heating can also be achieved using ohmic heating, direct steam injection, steam infusion, or microwaves to reach the hold tube temperature.

The term 'about', unless otherwise indicated, when used in conjunction with a numeral refers to a range spanning +/−10%, inclusive, around that numeral. For example, the term 'about 10 µm refers to a range of 9 to 11 µm, inclusive.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g. "such as") provided with respect to certain embodiments herein is intended merely to better illuminate the invention and is not intended to pose a limitation on the embodiments disclosed herein. No language in the specification should be construed as indicating any non-claimed element essential to the practice of the invention.

It should be apparent to those skilled in the art that many more modifications besides those already described are possible. The systems, methods and devices disclosed herein are not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A probiotic beverage composition comprising:
   calcium supplied from a calcium carbonate source comprising oolitic aragonite;
   a liquid component selected from the group consisting of water, a juice, a milk, and a combination thereof; and
   a probiotic.

2. The probiotic beverage composition of claim 1, wherein the oolitic aragonite is in the form of particles having a particle size of about 3 μm to about 10 μm in diameter.

3. The probiotic beverage composition of claim 1, wherein the oolitic aragonite comprises milled oolitic aragonite particles.

4. The probiotic beverage composition of claim 1, wherein the liquid component is juice and the juice is selected from the group consisting of a citrus juice, a non-citrus juice, a vegetable juice, and a combination thereof.

5. The probiotic beverage composition of claim 1, wherein the liquid component is the milk, wherein the milk is selected from the group consisting of a dairy milk, a non-dairy milk, or a combination thereof and the non-dairy milk is selected from the group consisting of soy milk, oat milk, almond milk, cashew milk, rice milk, coconut milk, pea milk, macadamia milk, hemp milk, quinoa milk, flax milk, and a combination thereof.

6. The probiotic beverage composition of claim 1, wherein the liquid component is present in amount of about 0.1% to about 99.9% by weight based on the total probiotic beverage composition.

7. The probiotic beverage composition of claim 1, wherein the calcium is present in amount of about 0.1% to about 10% by weight based on the total probiotic beverage composition.

8. The probiotic beverage composition of claim 1, wherein the probiotic comprises Bifidobacteria, Lactobacillus, or a combination thereof.

9. The probiotic beverage composition of claim 8, wherein the Bifidobacteria comprises B. brevis, B. animalis (laetis), B. longum, B. bifidum, B. adolescentis, B. thermophilum, B. infantile, or a combination thereof and the Lactobacillus comprises L. acidophilus, L. casei, L. rhamnosus, L, paracasei, L. johnsonii, L. reuteri, L. lactis, L. buigaricus, or a combination thereof.

10. The probiotic beverage composition of claim 1, further comprising as least one additive agent selected from the group consisting of an acidulant, a flavor agent, an antifoaming agent, a colorant, a preservative, a sweetener, a nutrient agent, a fiber, a bracer, a thickener, an antioxidant, an emulsifying agent, and a combination thereof.

11. The probiotic beverage composition of claim 1, further comprising carbon dioxide ($CO_2$).

12. The probiotic beverage composition of claim 1, wherein the calcium is further supplied from another source of calcium selected from the group consisting of amino acid chelated calcium, elemental calcium, calcium oxide, calcium hydroxide, calcium sulfate, calcium chloride, calcium phosphate, calcium hydrogen phosphate, calcium dihydrogen phosphate, calcium citrate, calcium picolinate, calcium malate, calcium aspartate calcium citrate malate, calcium gluconate, calcium tartrate, calcium ascorbate, calcium lactate, and a combination thereof.

13. A method of preparing a probiotic beverage composition, the method comprising:
    admixing oolitic aragonite particles and a probiotic with a liquid component selected from the group consisting of water, a juice, a milk, and a combination thereof.

14. The method of claim 13, wherein the liquid component is the juice, wherein the juice is selected from the group consisting of a citrus juice, a non-citrus juice, a vegetable juice, and a combination thereof or the liquid component is the milk, wherein the milk is selected from the group consisting of a dairy milk, a non-dairy milk, or a combination thereof.

15. The method of claim 13, wherein the aragonite particles have a particle size of about 3 μm to about 10 μm in diameter.

16. The method of claim 13, wherein the probiotic comprises Bifidobacteria, Lactobacillus, or a combination thereof, and wherein the Bifidobacteria comprises B. brevis, B. animalis (laetis), B. longum, B. bifidum, B. adolescentis, B. thermophilum, B. infantile, or a combination thereof and the Lactobacillus comprises L. acidophilus, L. casei, L. rhamnosus, L, paracasei, L. johnsonii, L. reuteri, L. lactis, L. buigaricus, or a combination thereof.

17. The method of claim 13, further comprising admixing at least one additive agent with the politic aragonite particles, the probiotic, and the liquid component, wherein the at least one additive agent is selected from the group consisting of a flavor agent, an antifoaming agent, a colorant, a flavanol, a preservative, a sweetener, a nutrient agent, a fiber, a thickener, an antioxidant, an emulsifying agent, a bracer, and a combination thereof.

18. A probiotic beverage composition comprising:
    calcium supplied from a calcium carbonate source comprising oolitic aragonite;
    a milk, wherein the milk is the only liquid component present; and
    a probiotic.

* * * * *